United States Patent [19]
Houle

[11] 3,768,323
[45] Oct. 30, 1973

[54] SPEED RESPONSIVE VARIABLE DIAMETER PULLEY

[75] Inventor: Michel Houle, Wickham, Quebec, Canada

[73] Assignee: The Coleman Company, Inc., Wichita, Kans.

[22] Filed: Dec. 27, 1971

[21] Appl. No.: 212,227

[52] U.S. Cl. ......................................... 74/230.17 E
[51] Int. Cl. ............................................ F16h 55/52
[58] Field of Search ........................... 74/230.17 E; 192/105 C, 89 W

[56] References Cited
UNITED STATES PATENTS

| | | | |
|---|---|---|---|
| 3,597,987 | 8/1971 | Kiekhaefer | 74/230.17 E |
| 3,605,510 | 9/1971 | Laughlin | 74/230.17 E |
| 3,675,500 | 7/1972 | Albertson | 74/230.17 E |
| 3,608,387 | 9/1971 | Fox | 74/230.17 E |

Primary Examiner—Charles J. Myhre
Assistant Examiner—R. H. Lazarus
Attorney—Dawson, Tilton, Fallon & Lungmus

[57] ABSTRACT

A variable diameter pulley of the type commonly used to form an automatic transmission for snowmobiles and including centrifugal weights wherein the improvements includes dissociating the rotative driving function from the axial displacement function, both heretofore imposed to the centrifugal weights. A pulley having a fixed and an axially displaceable flanges, speed responsive devices arranged to cause axial displacement of the axially displaceable flange and a holding member bodily fixed for rotation with the fixed flange, slidably and drivingly engaging the displaceable flange to allow axial displacement of the latter relative thereto, while driving the same. The displaceable flange and the holding member form wall portions radially converging towards each other to define cavities safely enclosing centrifugal weights therein.

7 Claims, 4 Drawing Figures

SPEED RESPONSIVE VARIABLE DIAMETER PULLEY

This invention relates to a variable diameter pulley and, more particularly, to a variable diameter pulley of the type having an axially displaceable flange and adaptable to be used with a V-belt and as a transmission for a snowmobile.

Variable diameter pulleys are known and used which include an axially displaceable flange and centrifugal weights pivotally mounted and arranged to axially displace such flange and also arranged to drivingly engage the same, whereby both above functions are performed by the centrifugal weights. Such construction results in many disadvantages or inconveniences among which: substantial twisting strains on the centrifugal weights and their pivots; a relatively high wear of these parts; flying out of the same under excessive strain, thereby causing a hazard for nearby persons; and noisy engagement of the weights into slots arranged to rotatively drive the displaceable flange.

It is a general object of the invention to provide a variable diameter pulley of simple construction which substantially avoids the above disadvantages and inconveniences, and in particular, which has reduced wear and increased life characteristics.

It is another general object of the invention to provide a variable diameter pulley of the above type, wherein the function of drivingly rotating the displaceable flange is dissociated from the function of axially displacing the same.

It is a further general object of the invention to provide a variable diameter pulley of the above type having centrifugal weights arranged to axially displace the displaceable flange independently of the rotative driving thereof.

It is a more specific object of the invention to provide a variable diameter pulley of the above type, wherein the function of axially displacing the displaceable flange is performed by centrifugal weights, while the function of rotatively driving the same is performed by a holding member which is arranged for substantially frictionless and noiseless axially slidable engagement with the displaceable flange.

It is another specific object of the invention to provide a variable diameter pulley having centrifugal weights and a holding member, wherein said weights are substantially confined to oppose the flying out thereof, should they brake loose.

The above and other objects and advantages of the invention will be better understood in the light of the following detailed description of a preferred embodiment which is illustrated, by way of example only, in the accompanying drawings, in which.

Figure 1:
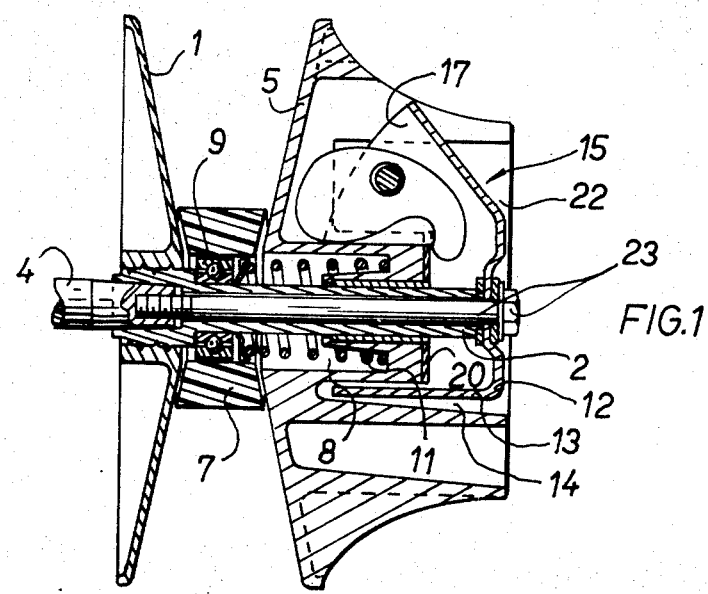
FIG. 1 is a cross-sectional view as seen along line 1—1 in FIG. 3.
Figure 2:
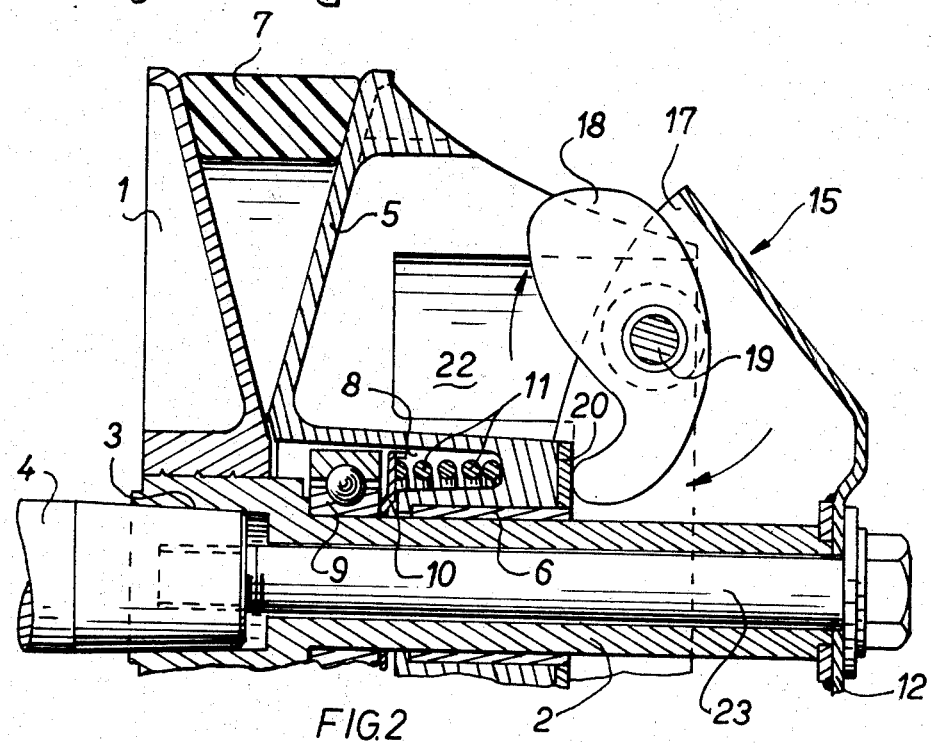
FIG. 2 is a similar view as FIG. 1 but showing the displaceable pulley flange in its closest position relative to the axially fixed pulley flange.

The illustrated pulley as best shown in FIGS. 1 and 2 includes a pulley flange 1, which is fixed onto a sleeve 2 which is enlarged at 3 to engage over the free end of a shaft 4. The pulley flange 1 is fixed to the sleeve 2 and retained against axial displacement relative thereto. A second pulley flange 5 is axially displaceably mounted onto the sleeve 2 by means of a bushing 6. The pulley flanges 1 and 5 form conical surfaces facing each other and defining an annular and radially diverging recess adapted to receive a V-belt 7.

The pulley flange 5 is provided with a hub having an annular space 8 to allow mounting of a ball bearing 9 around the sleeve 2, such that, when the pulley flanges 1 and 5 are fully moved apart from each other, as shown in FIG. 1, the belt 7 engages the outer race of the ball bearing 9 and thence is not liable to get caught between the two pulley flanges. A ring or washer 10 is positioned against the opposite side of the bearing 9 relative to the enlargement 3 and is arranged to form a seat for a compression spring 11 abutting at its other end against the closed end of the annular space 8. The spring 11 is therefore arranged to urge the axially displaceable pulley flange 5 away from the axially fixed pulley flange 1.

Figure 3:
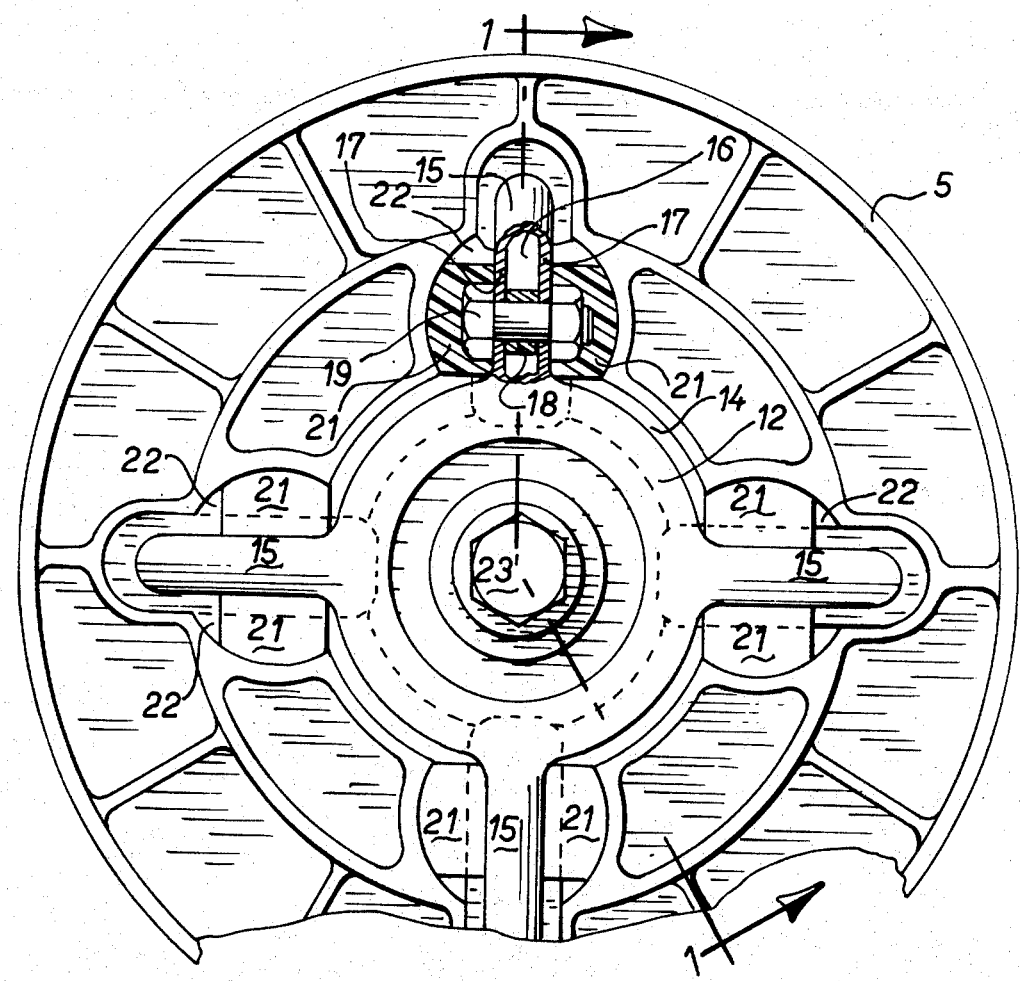
FIG. 3 is an end view of the pulley as seen from the right in FIG. 1.
Figure 4:
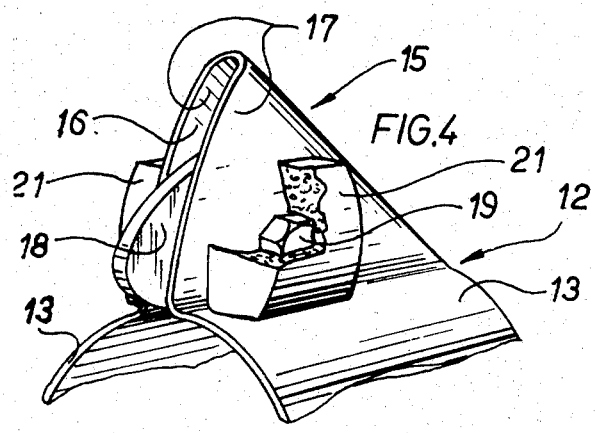
FIG. 4 is a perspective view showing the mounting of a centrifugal weight.

A generally cylindrical holding member 12 is fixed coaxially against the free end of the sleeve 2, whereby to bodily rotate therewith and to be axially fixed relative thereto. As shown in FIGS. 1 and 4, the holding member 12 has generally cylindrical portions 13 extending into an annular passage 14 on the outside of the displaceable flange 5. The otherwise cylindrical member 12 has its perpendicular wall shaped to form four projections 15, each defining a radially extending cavity 16 flanked by substantially parallel side walls 17. A centrifugal weight 18, of appropriate shape to provide suitable axial camming action on the displaceable flange 5, as is well known in the art, is mounted into each cavity 16. Each weight 18 is pivotally supported by a tangentially extending pivot formed by a bolt 19 extending through both side walls 17 and protruding exteriorly therefrom, as best shown in FIG. 3. The lighter end of the centrifugal weight 18 is arranged to engage against a contact ring 20 on the outer end of the hub of the displaceable flange 5, whereby to solely urge the latter axially towards the axially fixed flange 1 upon increase in the speed of rotation of the input shaft 4.

Each projection 15 is provided with a pad 21, of low friction material, fixed against the outside of each side wall 17, as can best be seen in FIGS. 3 and 4. The pads 21 may be made of nylon or other similar low friction materials. Each pad 21 caps or surrounds the corresponding protruding end of the bolt 19 associated to the same projection 15. Axial openings 22 are provided into the displaceable flange 5 and are arranged to form axial guideways for the blocks or pads 21 and the projections 15. It may therefore be appreciated that the rotative driving of axially displaceable pulley flange 5 is done by action of the projections 15 onto the latter through the blocks or pads 21. There results a relatively very silent drive. The caps or blocks 21 allow very smooth axial displacement of the displaceable pulley flange in slidable engagement with the rotatively driving holding member 12.

Both the pads 21 and the axial openings are formed of cylindrically mating surfaces to assure maximum unobstructed sliding of one relative to the other.

It must be pointed out that the displaceable pulley 5 and the projections 15 are formed with radially outwardly converging wall portions, as best seen in FIGS. 1 and 2, whereby to oppose flying out of the weights and pivots, should any breakage thereof occur.

The pulley according to the invention may be fixed onto one end of an input shaft 4 by a screw 23 threadedly engaging into the free end thereof.

It will be readily understood, even by persons unskilled in the art, that the number of projections 15 and of weights 18 need not be any specific figure, but that the choice of four has been made for design purposes.

Other changes or variations in the non-essential elements of the invention may be made without departing from the spirit and scope of the invention as defined in the appended claims.

I claim:

1. A variable diameter pulley comprising a first and a second pulley flanges coaxially mounted with respect to each other, said second pulley flange being axially displaceable onto a shaft means relative to said first pulley flange, said first and said second pulley flanges form belt engaging surfaces, facing each other and defining a radially enlarging space between each other relative to the common axis of said pulley flanges, holding means coaxially mounted with said pulley flanges, axially fixed to said shaft means and arranged for concomitant rotation therewith, resilient means urging said first and said second pulley flanges in one axial direction relative to each other, speed responsive means constructed and arranged to bias said second pulley flange in opposite axial direction relative to said one direction, and said holding means is constructed and arranged to drivingly engage said second pulley flange to transmit rotation of said shaft means thereto, while allowing relative axial displacement therewith, said holding means being provided with at least one projection axially slidably engaging said second pulley flange and constructed and arranged to transmit rotation thereto, wherein the improvement comprises said second pulley flange including axial guideways and said holding means including a plurality of projections axially slidably engaging into said guideways and arranged to allow said relative axial displacement between said second pulley flange and said holding means, and said axial guideways constituting axially extending openings defining smooth internal surfaces, all said projections constitute radially extending bosses having low friction material fixed thereto exteriorly thereof and arranged to slidably engage into said axial openings in contact with said smooth internal surfaces thereof.

2. A variable diameter pulley as defined in claim 1, wherein said low friction material forms a pair of pads fixed on opposite sides of each of said bosses.

3. A variable diameter pulley as defined in claim 2, wherein each of said bosses includes a radially extending cavity flanked by a pair of generally radially extending sides, and said speed responsive means includes a centrifugal weight means pivotally mounted into each of said cavities about a tangential pivot means supported by the corresponding pair of flanking sides and said centrifugal weight means are constructed and arranged to engage said second pulley flange to urge the latter into said opposite axial direction.

4. A variable diameter pulley as defined in claim 3, wherein each of said tangential pivot means form pivot ends protruding outwardly from the corresponding pair of sides and said one of said pads surrounds and is retained onto each of said pivot ends.

5. A variable diameter pulley as defined in claim 3, wherein said second pulley flange includes an annular flat surface facing towards said holding means and each of said centrifugal weight means constitutes an excentrically pivoted weight having one end adapted to axially engage said annular flat surface and to urge the second pulley flange towards said first pulley flange upon increase in the speed of rotation of said shaft means and said holding means.

6. A variable diameter pulley as defined in claim 1, wherein said holding means is fixed to said shaft means for bodily rotation therewith.

7. A variable diameter pulley as defined in claim 1, wherein said second pulley flange includes a hub portion having an annular space therein around said shaft means, said resilient means constitutes a coil spring arranged into said annular space and surrounding said shaft means, and a circular bearing is mounted onto said shaft means intermediate said first and second pulley flanges.

* * * * *